(12) United States Patent
Pescod et al.

(10) Patent No.: US 9,551,840 B2
(45) Date of Patent: Jan. 24, 2017

(54) PROVISION OF AN OPTICAL ROTATING JOINT INSTALLATION

(71) Applicant: BAE SYSTEMS plc, London (GB)

(72) Inventors: Christopher Ralph Pescod, Chelmsford (GB); Mohammed Nawaz, Chelmsford (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/430,835

(22) PCT Filed: Sep. 24, 2013

(86) PCT No.: PCT/GB2013/052492
§ 371 (c)(1),
(2) Date: Mar. 24, 2015

(87) PCT Pub. No.: WO2014/049343
PCT Pub. Date: Apr. 3, 2014

(65) Prior Publication Data
US 2015/0253512 A1    Sep. 10, 2015

(30) Foreign Application Priority Data

Sep. 25, 2012 (GB) .................................. 1217063.5

(51) Int. Cl.
*G02B 6/36* (2006.01)
*G02B 6/46* (2006.01)

(52) U.S. Cl.
CPC ............... *G02B 6/3604* (2013.01); *G02B 6/46* (2013.01); *Y10T 29/49716* (2015.01); *Y10T 29/49826* (2015.01)

(58) Field of Classification Search
CPC ..................................... G02B 6/36; G02B 6/46
(Continued)

(56) References Cited

U.S. PATENT DOCUMENTS 4,786,136 A    11/1988   Cannon
5,553,176 A     9/1996   DeMarco, Jr.
(Continued)

FOREIGN PATENT DOCUMENTS

CN    101221269 A1    7/2008
DE      4208140 A1    9/1993
(Continued)

OTHER PUBLICATIONS

International Preliminary Report on Patentability and Written Opinion received for Patent Application No. PCT/GB2013/052492, mailed on Apr. 9, 2015. 8 pages.
(Continued)

*Primary Examiner* — Kaveh C Kianni
(74) *Attorney, Agent, or Firm* — Finch & Maloney PLLC

(57) ABSTRACT

An optical rotating joint installation; comprising: a drive shaft for a rotating interface, the drive shaft comprising a hollow central bore; and an optical rotating joint located in the hollow central bore. The proportion of the cross-sectional area of the material retained in the annular section of the drive shaft is preferably greater than or equal to 50%, more preferably 60%, yet more preferably 75%. The diameter of the hollow central bore is preferably less than or equal to 20 mm, more preferably 16 mm. The optical rotating joint installation may be provided as a retro-fit to replace an existing solid drive shaft that does not have an optical rotating joint, for example by hollowing out the existing solid drive shaft or by replacing the existing solid drive shaft with a drive shaft with a hollow central bore.

16 Claims, 1 Drawing Sheet

(58) Field of Classification Search
USPC .......................................................... 385/26
See application file for complete search history.

(56) References Cited

U.S. PATENT DOCUMENTS

| | | | |
|---|---|---|---|
| 6,434,293 B1* | 8/2002 | Igeta et al. ....................... 385/25 |
| 6,628,338 B1* | 9/2003 | Elberbaum et al. ........... 348/373 |
| 2005/0069250 A1 | 3/2005 | Guy |
| 2008/0069495 A1* | 3/2008 | Hirohashi et al. .............. 385/25 |
| 2009/0207250 A1* | 8/2009 | Bennett et al. ............... 348/144 |
| 2009/0244545 A1 | 10/2009 | Toida |
| 2014/0163664 A1* | 6/2014 | Goldsmith ................... 623/1.11 |
| 2015/0192241 A1* | 7/2015 | Shannahan et al. .......... 348/373 |

FOREIGN PATENT DOCUMENTS

| | | |
|---|---|---|
| EP | 0982608 A1 | 3/2000 |
| JP | H06118318 A | 4/1994 |
| JP | H0933754 A | 2/1997 |
| WO | 2014049343 A1 | 4/2014 |

OTHER PUBLICATIONS

International Search Report and Written Opinion received for Patent Application No. PCT/GB2013/052492, mailed on Dec. 2, 2013. 10 pages.
GB Intellectual Property Office Search Report under Section 17(5) received for GB Patent Application No. 1217063.5, mailed Jan. 28, 2013. 4 pages.

* cited by examiner

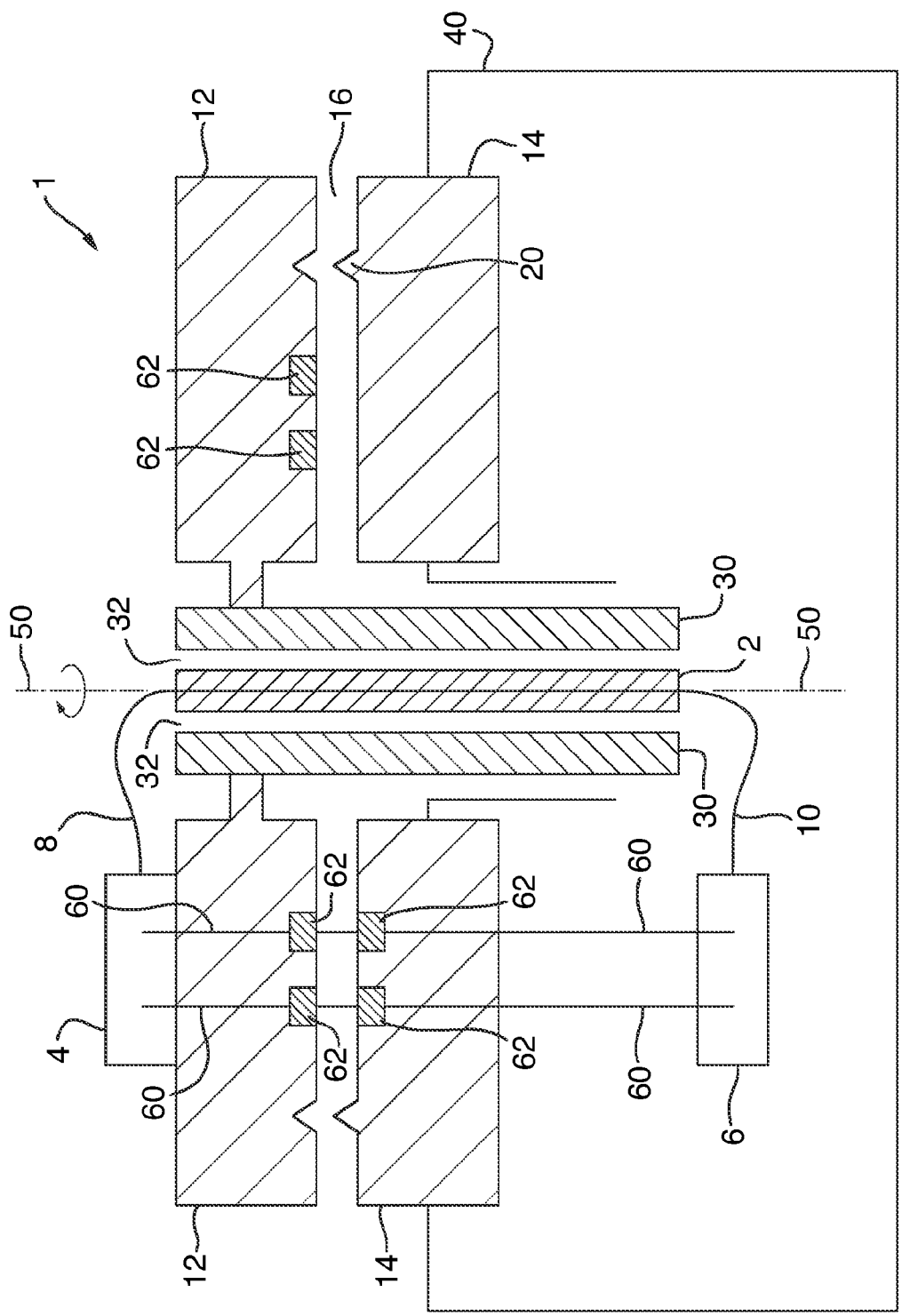

PROVISION OF AN OPTICAL ROTATING JOINT INSTALLATION

FIELD OF THE INVENTION

The present invention relates to the provision of an optical rotating joint installation.

BACKGROUND

Conventionally, in order to convey signals across an interface between two physical entities, where at least one of the physical entities is rotating, electrical slip rings are employed.

Conventionally, when the drive mechanism for the physical interface is provided by an off-axis gear mechanism, an optical rotating joint (ORJ), also known as a fibre optic rotary joint (FORJ) can additionally (or alternatively) be positioned along the axis of rotation to allow optical signals to be passed across the rotating interface. One type of ORJ is a single channel single-mode ORJ, i.e. one in which optical signals are transmitted across the rotating interface from one fixed single-mode optical fibre to one rotating single-mode optical fibre.

Conventionally however, when the when drive mechanism for the physical interface is provided by a substantially central drive shaft, this is considered to be an insurmountable obstacle, or at least a significant impediment, to the inclusion of an ORJ, at least one positioned along the axis of rotation. It is noted that, in contrast, slip rings are not affected by this as they are in an annular form, and hence do not require to be, and would tend not to benefit from, being positioned along the axis of rotation.

SUMMARY OF THE INVENTION

The present inventors have realised that contrary to conventional approaches and considerations, in particular the established view that an ORJ cannot be provided along the axis of rotation when there is a substantially central drive shaft, this is in fact possible and can be implemented by use of aspects of their invention.

Moreover the present inventors have further realised that the functionality and key properties of a substantially central drive shaft can be retained either completely or at least to a significant extent whilst nevertheless providing an ORJ positioned along the axis of rotation by means of aspects of their invention.

In a first aspect, the invention provides an optical rotating joint installation; comprising: a first platform; a second platform; a drive shaft arranged at a rotating interface between the first and second platform, the drive shaft being fixed to the first platform and rotatably mounted in the second platform, the drive shaft comprising a hollow central bore; an optical rotating joint located in the hollow central bore; and an annularly positioned slip ring between the first platform and the second platform and external to the shaft.

The proportion of the cross-sectional area of the material retained in the annular section of the drive shaft when the hollow central bore is provided compared to if the drive shaft were of solid-cross section may be greater than or equal to 50%.

The proportion of the cross-sectional area of the material retained in the annular section of the drive shaft when the hollow central bore is provided compared to if the drive shaft were of solid-cross section may be greater than or equal to 60%.

The proportion of the cross-sectional area of the material retained in the annular section of the drive shaft when the hollow central bore is provided compared to if the drive shaft were of solid-cross section may be greater than or equal to 75%.

The diameter of the hollow central bore may be less than or equal to 20 mm.

The diameter of the hollow central bore may be less than or equal to 16 mm.

In a further aspect, the present invention provides a method of providing an optical rotating joint installation; the method comprising: providing a drive shaft comprising a hollow central bore; and providing an optical rotating joint located in the hollow central bore.

The optical rotating joint installation may be provided as a retro-fit to replace an existing solid drive shaft that does not have an optical rotating joint.

The drive shaft with a hollow central bore may be provided by hollowing out the existing solid drive shaft.

The drive shaft with a hollow central bore may be provided by replacing the existing solid drive shaft with a drive shaft with a hollow central bore.

The proportion of the cross-sectional area of the material retained in the annular section of the drive shaft when the hollow central bore is provided compared to if the drive shaft were of solid-cross section may be greater than or equal to 50%.

The proportion of the cross-sectional area of the material retained in the annular section of the drive shaft when the hollow central bore is provided compared to if the drive shaft were of solid-cross section may be greater than or equal to 60%.

The proportion of the cross-sectional area of the material retained in the annular section of the drive shaft when the hollow central bore is provided compared to if the drive shaft were of solid-cross section may be greater than or equal to 75%.

The diameter of the hollow central bore may be less than or equal to 20 mm.

The diameter of the hollow central bore may be less than or equal to 16 mm.

BRIEF DESCRIPTION OF THE DRAWING

FIG. 1 is a schematic illustration (not to scale) of a first embodiment of an ORJ installation.

DETAILED DESCRIPTION

FIG. 1 is a schematic illustration (not to scale) of a first embodiment of an ORJ installation 1.

In the following description, the terminology "a rotating . . . " and "a fixed . . . " is used as a form of annotation for ease of reference to allow the reader to readily appreciate which elements in the particular embodiments described below are on the rotating side of the overall arrangement and which are on the fixed side. It will be appreciated that such terminology is merely used for identification purposes, and does not specify or imply any intrinsic rotation or otherwise (other than by virtue of being on the main rotating platform or not on it) of the particular element so identified.

The ORJ installation 1 comprises an ORJ 2, a sensor system 4, a control module 6, a drive shaft 30, a rotating optical fibre 8, and a fixed optical fibre 10. On the rotating side of its rotational interface the ORJ 2 is optically coupled to the sensor system 4 via the rotating optical fibre 8. On the fixed side of its rotational interface the ORJ 2 is optically coupled to the control system 6 via the fixed optical fibre 10. In operation the ORJ 2 allows optical signals to be passed between the sensor system 4 and the control system 6 (and vice-versa) via the rotating optical fibre 8 and the fixed optical fibre 10. In this embodiment the optical fibres 8, 10 are single mode optical fibres, and accordingly the ORJ 2 is an ORJ suitable for single mode fibres. However, this need not be the case, and in other embodiments other types of optical fibre, with a corresponding appropriate ORJ, may be used instead.

In this embodiment the ORJ interface system 1 further comprises a rotating platform section 12 and a fixed platform section 14 which in combination mechanically provide the rotational interface 16 served by the ORJ 2 by virtue of the relative rotational motion of the rotating platform section 12 to the fixed platform section 14. The rotating platform 12 is mechanically coupled to the drive shaft 30, and the rotation of the rotating platform 12 relative to the fixed platform 14 is implemented by virtue of the drive shaft rotating compared to the fixed platform section 14. The drive shaft 30 is coupled to a geared spindle 104 of a motor 106 by means of a gearing 102 applied to the external surface of the shaft 30, and thus the shaft 30 is operable to rotate under the influence of the motor 106. Consequently, the axis of rotation 50 is along the central radial axis of the drive shaft.

The drive shaft 30 is hollowed out at its centre along the length of its axis that is parallel to the axis of rotation, i.e. the drive shaft 30 is provided with a hollow central bore 32. The ORJ 2 is provided in the hollow central bore 32 of the drive shaft 30 i.e. the ORJ 2 is positioned within the hollowed out central bore 32 of the drive shaft 30. In this embodiment the hollow central bore is provided by drilling or otherwise removing the central material from a previously formed solid drive shaft. This is, for example, advantageous when carrying out a retro fit procedure. However, in other embodiments the drive shaft with central hollow bore may be provided in other ways, for example by welding together two semi-circular wall sections to provide a hollow final assembled drive shaft.

The movement of the rotating platform relative to the fixed platform 14 is further facilitated by bearings 20 positioned on the face of the fixed platform 14 that faces the rotating platform 12.

In this embodiment the sensor system comprises a plurality of camera sensors. In other embodiments one or more other types of sensors may be employed in addition to or instead of camera sensors. Indeed, in yet further embodiments, apparatus other than sensors may have its optical signals communicated across the rotational interface 16 by the ORJ 2. The sensor system 4 is attached in a fixed manner to the rotating platform 12.

The control system 6 and fixed platform 14 are held in a fixed housing 40.

In this embodiment, electrical coupling is provided between the sensor system 4 and the control system 6 by electrical cables 60. The rotating platform 12 and the fixed platform 14 further comprise in combination a conventional electrical slip ring arrangement 62, often referred to as a pancake slip ring, for transferring electrical power being supplied along the electrical cables 60 over the rotational interface 16.

In this embodiment, in operation, control signals are delivered by the ORJ installation 1 from the control system 6 to the sensor system 4. In the reverse direction output (e.g. video) signals from the sensor system 4 are delivered by the ORJ installation 1 from the sensor system 4 to the control system 6. This delivery is via the following sequence of elements: the sensor system 4; the rotating optical fibre 8; the ORJ 2; the fixed optical fibre 10; and the control system 6 (and in the reverse order for the reverse direction).

In this embodiment signals are passed in both directions across the ORJ. However, this need not be the case, and in other embodiments signals are only sent unidirectional, e.g. only control signals or only sensor output signals, or some other form of signal.

In this embodiment the sensor system is on a part that is conveniently considered as rotating relative to a fixed part. However, clearly when there is relative rotation either (or both) entity may be considered as rotating compared to the other, and hence such terminology is not used in a limiting sense herein.

In this embodiment the ORJ is used to communicate signals to and from camera sensors, however this need not be the case, and in other embodiments signals for or from other types of apparatus may be passed via the ORJ in addition to, or instead of, signals related to sensors. For example communications data and Radio Frequency transmit or receive signals may be passed through the ORJ.

In this embodiment, the control system 6 may be arranged to forward the received output data to any desired further entities, for example video recorders, displays, and so on. Correspondingly, the control system 6 may be arranged to receive the control data or data from which it can determine control data from any desired further entities.

In this embodiment there is only a single ORJ, and moreover the ORJ is a single-channel ORJ. However, this need not be the case, and in other embodiments multi-channel ORJs may be used instead.

In this embodiment the ORJ (or in the case of the preceding paragraph multi-channel ORJs) is a single mode fibre ORJ. However, this need not be the case, and in other embodiments one or more multi-mode fibre ORJs may be used instead or in addition to a single mode fibre ORJ.

In this embodiment the external diameter of the drive shaft 30 is 25 mm, the diameter of the hollow central bore 32 is 16 mm, and the external diameter of the ORJ 2 is 14 mm (i.e. there is a total clearance between the ORJ 2 and the wall of the hollow central bore 32 of 2 mm, distributed approximately as 1 mm at each end of any given diameter). By virtue of sizes such as these, the benefits of using an ORJ positioned along the axis of rotation are achieved whilst nevertheless using a central drive shaft to provide the mechanical rotation, with the mechanical properties of the central drive shaft being relatively unaffected. For example, the remaining cross-sectional area of the annulus of material of the drive shaft 30 in this embodiment is $\pi(12.5^2-8^2)$ mm$^2$=$\pi \times 92.25$ mm$^2$, whereas the cross-sectional area that the same drive shaft would have had were it not hollowed out is $\pi \times 12.5^2$ mm$^2$=$\pi \times 156.25$ mm$^2$, i.e. in this embodiment the hollowed out drive shaft retains about 60% of the cross-sectional area of the solid one and hence approximately its physical strength is retained or at least not catastrophically diminished. Or, considered in a different sense, a drive shaft will only need to be widened a little to allow room for the hollow central bore if a given remaining cross-sectional area of shaft material were required when designing a new drive shaft. In view of such considerations, arrangements with the following ranges of dimensions are particularly advantageous:

Proportion of the cross-sectional area of the material retained in the annular section of the drive shaft when a hollow central bore is provided compared to if the drive shaft were of solid-cross section, i.e. with no bore:
  (i) preferably greater than or equal to 50%;
  (ii) more preferably greater than or equal to 60%;
  (iii) yet more preferably greater than or equal to 75%.
Diameter of the hollow central bore 32:
  (i) preferably less than or equal to 20 mm;
  (ii) more preferably less than or equal to 16 mm;
  (iii) yet more preferably less than or equal to 10 mm.

A further advantage of providing the ORJ in a hollow central bore of the drive shaft is that other design details, such as the annularly positioned slip rings (i.e. external to the hollow drive shaft), the bearings, and so on, do not need to be changed. This is particularly advantageous when a retro-fit is carried out, i.e. an existing solid drive shaft is hollowed out (or replaced by a similar drive shaft that is however hollow) to allow an ORJ to be provided at a rotating interface arrangement that previously did not have optical signal capability. This is particularly advantageous when used to provide higher bandwidth capability to an arrangement, which may for example become required or desirable due to ever-increasing data flow requirements produced by the emergence of higher bandwidth cameras and so on.

The invention claimed is:

1. An optical rotating joint installation comprising:
  a first platform;
  a second platform;
  a drive shaft arranged at a rotating interface between the first and second platform, the drive shaft being fixed to the first platform and rotatably mounted in the second platform, the drive shaft comprising a hollow central bore;
  an optical rotating joint located in the hollow central bore; and
  an annularly positioned slip ring between the first platform and the second platform and external to the drive shaft,
  wherein one of the first platform and the second platform comprises a sensor system and the other of the first platform and the second platform comprises a control system, and the optical rotating joint allows optical signals to be passed between the sensor system and the control system.

2. The optical rotating joint installation according to claim 1, wherein a proportion of a cross-sectional area of material retained in an annular section of the drive shaft having the hollow central bore compared to a drive shaft having a solid-cross section is greater than or equal to 50%.

3. The optical rotating joint installation according to claim 1, wherein a proportion of a cross-sectional area of material retained in an annular section of the drive shaft having the hollow central bore compared to a drive shaft having a solid-cross section is greater than or equal to 60%.

4. The optical rotating joint installation according to claim 1, wherein a proportion of a cross-sectional area of material retained in an annular section of the drive shaft having the hollow central bore compared to a drive shaft having a solid-cross section is greater than or equal to 75%.

5. The optical rotating joint installation according to claim 1, wherein a diameter of the hollow central bore is less than or equal to 20 mm.

6. The optical rotating joint installation according to claim 1, wherein a diameter of the hollow central bore is less than or equal to 16 mm.

7. The optical rotating joint installation according to claim 1, wherein the first platform comprises the control system and the second platform comprises the sensor system.

8. The optical rotating joint installation according to claim 1, wherein the sensor system comprises one or more video camera sensors.

9. An optical rotating joint installation kit comprising:
  a drive shaft comprising a hollow central bore, the drive shaft configured to be arranged at a rotating interface between a first platform and a second platform, the drive shaft configured to be fixed to the first platform and rotatably mounted in the second platform;
  an optical rotating joint configured to be located in the hollow central bore; and
  a slip ring configured to be annularly positioned between the first platform and the second platform and external to the drive shaft,
  wherein one of the first platform and the second platform comprises a sensor system and the other of the first platform and the second platform comprises a control system, and the optical rotating joint is configured to allow optical signals to be passed between the sensor system and the control system.

10. The kit according to claim 9, wherein a proportion of a cross-sectional area of material retained in an annular section of the drive shaft having the hollow central bore compared to a drive shaft having a solid-cross section is greater than or equal to 50%.

11. The kit according to claim 9, wherein a proportion of a cross-sectional area of material retained in an annular section of the drive shaft having the hollow central bore compared to a drive shaft having a solid-cross section is greater than or equal to 60%.

12. The kit according to claim 9, wherein a proportion of a cross-sectional area of material retained in an annular section of the drive shaft having the hollow central bore compared to a drive shaft having a solid-cross section is greater than or equal to 75%.

13. The kit according to claim 9, wherein a diameter of the hollow central bore is less than or equal to 20 mm.

14. The kit according to claim 9, wherein a diameter of the hollow central bore is less than or equal to 16 mm.

15. The kit according to claim 9, wherein the first platform comprises the control system and the second platform comprises the sensor system.

16. The kit according to claim 9, wherein the sensor system comprises one or more video camera sensors.

* * * * *